Figure 1:
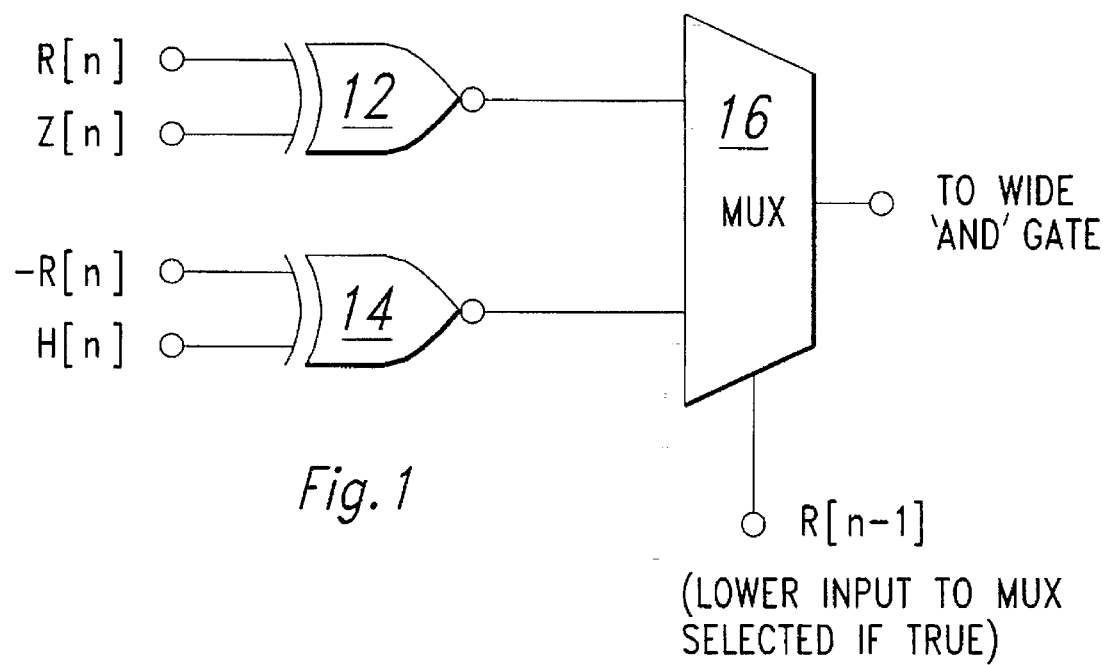

United States Patent [19]
Simpson

[11] Patent Number: 5,644,521
[45] Date of Patent: Jul. 1, 1997

[54] COMPARATOR SCHEME

[75] Inventor: Richard Simpson, Bedford, England

[73] Assignee: Texas Instruments Incorporated, Dallas, Tex.

[21] Appl. No.: 399,261

[22] Filed: Mar. 6, 1995

[30] Foreign Application Priority Data

Mar. 7, 1994 [GB] United Kingdom ............ 9404377

[51] Int. Cl.$^6$ ................................................. G06F 7/50
[52] U.S. Cl. ........................... 364/736.5; 364/787.01
[58] Field of Search ................ 364/736.5, 715.01, 364/768, 787

[56] References Cited

U.S. PATENT DOCUMENTS

| | | | |
|---|---|---|---|
| 3,983,382 | 9/1976 | Weinberger | 364/736.5 |
| 4,947,359 | 8/1990 | Vassiliadas | 364/736.5 |
| 5,020,016 | 5/1991 | Nakano et al. | 364/736.5 |
| 5,270,955 | 12/1993 | Bosshart et al. | 364/736.5 |
| 5,367,477 | 11/1994 | Hinds et al. | 364/736.5 |
| 5,508,950 | 4/1996 | Bosshart et al. | 364/736.5 |

FOREIGN PATENT DOCUMENTS

| | | |
|---|---|---|
| 0 191 452 | 8/1986 | European Pat. Off. . |
| 0 328 871 | 8/1989 | European Pat. Off. . |
| 0 434 381 | 6/1991 | European Pat. Off. . |

OTHER PUBLICATIONS

IEEE Transactions on Computers, vol. 41, No. 11, Nov. 1992, New York, pp. 1484–1488, XP 000331189, Cortadella et al "Evaluation of A+B=K Conditions Without Carry Propagation".

IEEE International Symposium on Circuits and Systems, ESP00, Jun. 7–9, 1988, vol. 1 of 3, Institute of Electrical and Electronics Enginners, pp. 243–246, XP 000011396, "Evaulating A+B=K Conditions in Constant Time", Cortadella J. et al.

*Primary Examiner*—David H. Malzahn
*Attorney, Agent, or Firm*—Robert D. Marshall, Jr.; James C. Kesterson; Richard L. Donaldson

[57] ABSTRACT

Method for testing whether the result of an addition or subtraction of two or more variables will equal a specified third value without actually performing an addition or subtraction operation. The method involves the representation of the inputs to the carry ripple portion of an adder at any bit position by a plurality of mutually exclusive variables, and testing the plurality of variables against a plurality of predetermined conditions. A determination is then made as to whether the test is positive or negative—if positive, the result of the mathematical operation is the predetermined number, and if negative, the result of the mathematical operation is not the predetermined number.

2 Claims, 1 Drawing Sheet

COMPARATOR SCHEME

This invention relates to improvements in comparator schemes, as carried out in the Arithmetic Logic Unit (ALU) of a microprocessor.

A typical microprocessor includes the following functional blocks. A central Processing Unit (CPU) which comprises circuitry required to access the appropriate locations in memory and interpret resulting instructions. The execution of the instructions take place in the CPU. The CPU contains the Arithmetic Logic Unit (ALU), a control section, various registers etc. The exact content of the CPU will obviously vary depending on the application of the microprocessor. The ALU is a combinational network that performs arithmetic and logical operations on data. Typical operations which are carried out include adding, subtracting, multiplying, dividing and comparing operations.

In operation the speed of the processor is dependent on the speed of operation of any of the individual blocks within the processor. In addition there is constant effort being undertaken to make the components of the processor both smaller and less speed critical.

According to one aspect of the present invention there is provided a comparator scheme for determining the result of a mathematical operation without carrying out said mathematical operation, comprising the steps of:

obtaining the value of two or more variables;

testing said variables against a plurality of predetermined conditions thereby determining whether the result of the mathematical operation will be equal to a predetermined value;

determining if the test is positive in which case concluding that the result of the mathematical operation is the predetermined number, and;

determining if the test is negative in which case concluding that the result of the mathematical operation is not the predetermined number.

Reference will now be made to the single FIGURE of the drawings, which is a circuit diagram of a possible implementation of the present invention.

The invention concerns a means for testing if the result of an addition (or subtraction) of two variables will be equal to a specified third value without doing the operation of addition (or subtraction).

The INPUTS to the carry ripple portion of an adder at any bit position [n] can be represented using three MUTUALLY EXCLUSIVE variables, namely:

| $P[n]$ | Propagate, | $Cout = Cin$ | When adding 1 + 0, or 0 + 1; |
| $G[n]$ | Generate, | $Cout = 1$ | When adding 1 + 1; and |
| $K[n]$ | Kill, | $Cout = 0$ | When adding 0 + 0. |

Consider the following simple sum.

$Sum[n] = P[n]$ xor $C[n-1]$.

If $P[n-1]$ is false, then $Cout[n-1]$ is known and so $Sum[n]$ can be determined with certainty. If $P[n-1]$ is true, then $Cout[n-1]$ is not known and so $Sum[n]$ is not known. But, if $P[n]$ is also true then $Sum[n]$ will be the said as $Sum[n-1]$. Or, it $P[n]$ is false then $Sum[n]$ will be the opposite to $Sum[n-1]$.

From this it can be seen that examination of $P[n,n-1]$, $G[n,n-1]$ and $K[n,n-1]$ will lead to four possible conditions:

1 $Sum[n]=0$;
2 $Sum[n]=1$;
3 $Sum[n]=Sum[n-1]$; and
4 $Sum[n]=\sim Sum[n-1]$.

From this information it is possible to make further assumptions. If $P[n-1]=0$ for a certain $Sum[n]=0$, then:
$P[n]=1$ and $G[n-1]=1$; and/or
$P[n]=0$ and $K[n-1]=1$.
Similarly if $P[n-1]=0$ for a certain $Sum[n]=1$, then:
$P[n]=0$ and $G[n-1]=1$; and/or
$P[n]=1$ and $K[n-1]=1$.
It further follows that if $P[n-1]=1$ for $Sum[n]=Sum[n-1]$ then $P[n]=1$ and for $Sum[n]=\sim Sum[n-1]$ then $P[n]=0$ As can be seen, EITHER the Sum is known, OR the relationship to the previous bit is known. If the full result of the ADD is known, all that is required to test if the answer is the required value, is for each bit to say if it is correct, (i.e. invert if testing for zero, pass if testing for 1), and put these into a wide fast parallel AND gate.

This new method does not wait on the SUM at each bit to be available, but considers overlapping pairs. The TEST at each bit is a double test, EITHER $Sum[n]$ is known, and it is correct, OR IF $Sum[n]$ is not known, its relationship to $Sum[n-1]$ must be correct. If the double test PASSES at EVERY bit position the answer WILL be the required result. If this double test FAILS at ANY bit position the result WILL NOT be the required result.

The tests are as follows:

If the target result is 00 i.e., we want to know if $Sum[n]=0$ and $Sum[n-1]=0$ then EITHER $Sum[n]=0$, OR $Sum[n]=Sum[n-1]$ which yields the following:

| $P[n] = 1$ and $G[n-1] = 1$ | $Sum[n] = 0$; |
| $P[n] = 0$ and $K[n-1] = 1$ | $Sum[n] = 0$; and |
| $P[n] = 1$ and $P[n-1] = 1$ | $Sum[n] = Sum[n-1]$. |

This can be simplified to be $P[n]$ xor $K[n-1]$.

If the target result is 01 i.e., we want to know if $Sum[n]=0$ and $Sum[n-1]=1$ then EITHER $Sum[n]=0$, OR $Sum[n]=\sim Sum[n-1]$ which yields the following:

| $P[n] = 1$ and $G[n-1] = 1$ | $Sum[n] = 0$; |
| $P[n] = 0$ and $K[n-1] = 1$ | $Sum[n] = 0$; and |
| $P[n] = 0$ and $P[n-1] = 1$ | $Sum[n] = \sim Sum[n-1]$. |

This can be simplified to be $P[n]$ xor $\sim G[n-1]$.

If the target result is 10 i.e., we want to know if $Sum[n]=1$ and $Sum[n-1]=0$ then EITHER $Sum[n]=1$, OR $Sum[n]=\sim Sum[n-1]$ which yields the following:

| $P[n] = 0$ and $G[n-1] = 1$ | $Sum[n] = 1$; |
| $P[n] = 1$ and $K[n-1] = 1$ | $Sum[n] = 1$; |
| $P[n] = 0$ and $P[n-1] = 1$ | $Sum[n] = \sim Sum[n-1]$. |

This can be simplified to be $P[n]$ xor $\sim K[n-1]$.

If the target result is 11 i.e., we want to know if $Sum[n]=1$ and $Sum[n-1]=1$ then EITHER $Sum[n]=1$, OR $Sum[n]=Sum[n-1]$ which yields the following:

| $P[n] = 0$ and $G[n-1] = 1$ | $Sum[n] = 1$; |
| $P[n] = 1$ and $K[n-1] = 1$ | $Sum[n] = 1$; and |
| $P[n] = 1$ and $P[n-1] = 1$ | $Sum[n] = Sum[n-1]$. |

This can be simplified to be $P[n]$ xor $G[n-1]$.
If we create two new variables, i.e.:
$P[n]$ xor $K[n-1]=Z[n]$; and P[n] xor G[n−1]=H[n], then the 00 test is Z[n], the 01 test is ~H[n], the 10 test is ~Z[n] and the 11 test is H[n]. For example to test for bit zero is slightly different. Here it is necessary to test for a 1 with P[0] xor cin; and test for a 0 with P[0] xor ~cin. (i.e. evaluate it). The table below illustrates this.

```
1 1 1 1 0 0 1 1
    - -
H H H Z Z H H   these must be ANDed together.
```

One way of implementing all this to build 2 extra xor gates per ALU bit, and create the Z[n] and H[n] terms. These are then used, as appropriate, as inputs to a wide AND gate to detect any required value. This is very simple for a constant, for example C.

To compare against a register value, R, the circuit of FIG. 1 may be used. This circuit uses eight more transistors than the xor gate that is required if the Sum is used, but these gates are now not speed critical, and so could be substantially smaller than would previously have been the case. As can be seen from the FIGURE a circuit to carry out the invention may comprise two XNOR gates 12, 14 and a MUX 16. Inputs to the XNOR gates are passed to the MUX and the register value R[n−1] is selected if the comparison of the values is true. Obviously this is just one means by which the function of this invention can be achieved. As will be apparent to the man skilled in the art other Boolean architectures can be chosen which have the same result.

Accordingly this implementation means that it is not necessary to wait for the adder to conclude its operation, as the comparator scheme can take it's place as indicated above.

I claim:

1. A method for determining if a sum of two multibit variables equals a predetermined value comprising the steps of:

forming a propagate carry output for each sum bit;

forming a generate carry output for each sum bit;

forming a kill carry output for each sum bit;

forming a Z output for each sum bit from said propagate carry output of said bit exclusive ORed with said kill carry output from a next least significant bit;

forming an H output for each sum bit from said propagate carry output of said bit exclusive ORed with said generate carry output from a next least significant bit;

for each sum bit forming an exclusive NOR of said corresponding bit of said predetermined value with said Z output of said corresponding bit;

for each sum bit forming an exclusive NOR of an inverse of said corresponding bit of said predetermined value with said H output of said corresponding bit;

for each sum bit selecting said exclusive NOR of said corresponding bit of said predetermined value with said Z output of said corresponding bit if said predetermined value of a next least significant bit is 0, said exclusive NOR of said inverse of said corresponding bit of said predetermined value with said H output of said corresponding bit if said predetermined value of a next least significant bit is 1;

forming an AND of said selected exclusive NOR for all sum bits; and determining said sum equals said predetermined value if said AND is 1 and determining said sum does not equal said predetermined value if said AND is 0.

2. A circuit for determining if a sum of two multibit variables equals a predetermined value comprising:

for each bit a first exclusive OR gate having a first input receiving a propagate carry signal from said corresponding bit, a second input receiving a kill carry signal from a next least significant bit and an output, a second exclusive OR gate having a first input receiving a propagate carry signal from said corresponding bit, a second input receiving a generate carry signal from a next least significant bit and an output, a first exclusive NOR gate having a first input receiving said corresponding bit of said predetermined value, a second input receiving said output of said first exclusive OR gate, and an output, a second exclusive NOR gate having a first input receiving an inverse of said corresponding bit of said predetermined value, a second input receiving said output of said second exclusive OR gate, and an output;

a multiplexer having a first input receiving said output of said first exclusive NOR gate, a second input receiving said output of said second exclusive NOR gate, a control input receiving said predetermined value for a next least significant bit, said multiplexer selecting for output said second input if said predetermined value of said next least significant bit is 1 and selecting for output said first input if said predetermined value of said next least significant bit is 0; and a multi-input AND gate having an input for each multiplexer output, and an output, said circuit determining the sum equals the predetermined value if said output of said multi-input AND gate is 1 and determining the sum does not equal the predetermined value if said output of said multi-input AND gate is 0.

* * * * *